United States Patent
Anchuri et al.

(10) Patent No.: US 10,229,223 B2
(45) Date of Patent: *Mar. 12, 2019

(54) MINING RELEVANT APPROXIMATE SUBGRAPHS FROM MULTIGRAPHS

(71) Applicant: International Business Machines Corporation, Armonk, NY (US)

(72) Inventors: Pranay Anchuri, Troy, NY (US); Michele Berlingerio, Noicattaro (IT); Stefano Braghin, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 620 days.

This patent is subject to a terminal disclaimer.

(21) Appl. No.: 14/748,350

(22) Filed: Jun. 24, 2015

(65) Prior Publication Data
US 2016/0350384 A1 Dec. 1, 2016

Related U.S. Application Data

(63) Continuation of application No. 14/726,789, filed on Jun. 1, 2015.

(51) Int. Cl.
*G06F 17/30* (2006.01)

(52) U.S. Cl.
CPC .. *G06F 17/30958* (2013.01); *G06F 17/30277* (2013.01); *G06F 17/30297* (2013.01);
(Continued)

(58) Field of Classification Search
CPC ........... G06F 17/30958; G06F 17/2785; G06F 17/30401; G06F 17/30864;
(Continued)

(56) References Cited

U.S. PATENT DOCUMENTS 5,732,192 A * 3/1998 Malin ................. G06F 17/5036
703/2
6,295,504 B1 * 9/2001 Ye ............................. G01V 3/38
702/11

(Continued)

OTHER PUBLICATIONS

Raghav Kaushik et al., "Exploiting Local Similarity for Indexing Paths in Graph-Structured Date", Proceedings of the 18th International conference on data engineering (ICDE.02), 2002, 12 pages.*

(Continued)

*Primary Examiner* — Srirama Channavajjala
(74) *Attorney, Agent, or Firm* — Stephen R. Tkacs; Stephen J. Walder, Jr.; Kurt P. Goudy (57) ABSTRACT

A mechanism is provided in a data processing system for extracting subgraphs from a multigraph with approximation. The mechanism receives a multigraph and a relevance function and a pattern generation component executing within the data processing system searches the multigraph for occurrences of at least one pattern based on an approximation function. A relevance computation component executing within the data processing system determines a relevance measure for the multigraph based on the relevance function and the occurrences of the at least one pattern. The mechanism provides output of relevant patterns based on the occurrences of the at least one pattern.

9 Claims, 4 Drawing Sheets

(52) U.S. Cl.
CPC .. *G06F 17/30539* (2013.01); *G06F 17/30572* (2013.01); *G06F 17/30705* (2013.01); *G06F 17/30823* (2013.01); *G06F 17/30979* (2013.01)

(58) Field of Classification Search
CPC ......... G06F 17/30442; G06F 17/30469; G06F 17/30979; G06F 17/30539; G06F 17/30572; G06F 17/30277; G06F 17/30297; G06F 17/30823; G06F 17/30705
See application file for complete search history.

(56) References Cited

U.S. PATENT DOCUMENTS

| | | | |
|---|---|---|---|
| 6,598,043 | B1 | 7/2003 | Baclawski |
| 7,933,915 | B2 | 4/2011 | Singh et al. |
| 8,380,645 | B2 | 2/2013 | Kowalski |
| 8,446,842 | B2 * | 5/2013 | Cao .................. G06F 17/30477 370/254 |
| 9,934,327 | B2 * | 4/2018 | Anchuri ............ G06F 17/30958 |
| 2004/0267686 | A1 * | 12/2004 | Chayes ............... G06F 17/3071 |
| 2007/0226248 | A1 * | 9/2007 | Darr ....................... G06Q 10/10 |
| 2009/0271433 | A1 * | 10/2009 | Perronnin ............... G06F 17/16 |
| 2011/0173189 | A1 * | 7/2011 | Singh ................ G06F 17/30958 707/722 |
| 2011/0191359 | A1 * | 8/2011 | Larriba Pey ............ G06F 17/10 707/756 |
| 2011/0313960 | A1 * | 12/2011 | Patil ..................... G06K 9/6253 706/12 |
| 2012/0096042 | A1 | 4/2012 | Brockett et al. |
| 2012/0317088 | A1 * | 12/2012 | Pantel ............... G06F 17/30893 707/706 |
| 2013/0024412 | A1 * | 1/2013 | Gong ...................... G06N 5/00 706/46 |
| 2013/0097138 | A1 | 4/2013 | Barkol et al. |
| 2013/0298130 | A1 * | 11/2013 | Pienaar ................. G06F 9/4887 718/102 |
| 2014/0149376 | A1 | 5/2014 | Kutaragi et al. |
| 2014/0208296 | A1 * | 7/2014 | Dang ........................ G06F 8/75 717/123 |
| 2014/0365503 | A1 * | 12/2014 | Franceschini ..... G06F 17/30958 707/748 |
| 2016/0350384 | A1 * | 12/2016 | Anchuri ............ G06F 17/30958 |
| 2016/0350443 | A1 * | 12/2016 | Anchuri ............ G06F 17/30958 |
| 2017/0308620 | A1 | 10/2017 | Cao et al. |
| 2018/0004751 | A1 * | 1/2018 | Vikhe ................. G06F 17/3053 |

OTHER PUBLICATIONS

List of IBM Patents or Patent Applications Treated as Related, 2 pages.

Anchuri, Pranay et al., "Approximate Graph Mining with Label Costs", KDD '13, Aug. 11-14, 2013, Chicago, Illinois, USA, 9 pages.

Chen, Chen et al., "gApprox: Mining Frequent Approximate Patterns from a Massive Network", ICDM 2007, Seventh IEEE International Conference on Data Mining, Omaha, NE, USA, Oct. 28-31 2007, 6 pages.

Jia, Yi et al., "An Efficient Graph-Mining Method for Complicated and Noisy Data with Real-World Applications", Knowl Inf Syst (2011) 28:423-447, DOI 10.1077/s10115-010-0376, Published online: Feb. 2, 2011, 25 pages.

Jiang, Chuntao et al., "Frequent Sub-graph Mining on Edge Weighted Graphs", Data Warehousing and Knowledge Discovery: 12th International Conference, DaWaK 2010, Bilbao, Spain, Aug. 30-Sep. 2, 2010, 12 pages.

Kiefer, Christoph et al., "The Fundamentals of iSPARQL: A Virtual Triple Approach for Similarity-Based Semantic Web Tasks", International Semantic Web Conference, ISWC 2007, Busan, Korea, Nov. 11-15, 2007, 14 pages.

Koutra, Danai et al., "Algorithms for Graph Similarity and Subgraph Matching", Department of Computer Science, Carnegie Mellon University, Dec. 4, 2011, 50 pages.

Yan, Xifeng et al., "gSpan: Graph-Based Substructure Pattern Mining", ICDM 2003, International Conference on Data Mining, Melbourne, Florida, USA, Nov. 19-22, 2003, 4 pages.

* cited by examiner

COMPONENTS

FIG. 8

MINING RELEVANT APPROXIMATE SUBGRAPHS FROM MULTIGRAPHS

BACKGROUND

The present application relates generally to an improved data processing apparatus and method and more specifically to mechanisms for mining relevant approximate subgraphs from multigraphs.

A graph is an abstract data type that is meant to implement the graph and directed graph concepts from mathematics. A graph data structure consists of a finite (and possibly mutable) set of nodes or vertices, together with a set of ordered pairs of these nodes (or, in some cases, a set of unordered pairs). These pairs are known as edges or arcs. As in mathematics, an edge (x,y) is said to point or go from x to y. The nodes may be part of the graph structure, or may be external entities represented by integer indices or references. A graph data structure may also associate to each edge some edge value, such as a symbolic label or a numeric attribute (cost, capacity, length, etc.). A directed graph (or digraph) is a graph, or set of nodes connected by edges, where the edges have a direction associated with them.

A multigraph is a graph that is permitted to have multiple edges (also called parallel edges), i.e., multiple edges that have the same end nodes. Thus two vertices may be connected by more than one edge. There are two distinct notions of multiple edges:

Edges without own identity: The identity of an edge is defined solely by the two nodes it connects. In this case, the term "multiple edges" means that the same edge can occur several times between these two nodes; and, Edges with own identity: Edges are primitive entities just like nodes. When multiple edges connect two nodes, these are different edges.

SUMMARY

In one illustrative embodiment, a method, in a data processing system, is provided for extracting subgraphs from a multigraph with approximation. The method comprises receiving, by the data processing system, a multigraph and a relevance function. The method further comprises searching, by a pattern generation component executing within the data processing system, the multigraph for occurrences of at least one pattern based on an approximation function. The method further comprises determining, by a relevance computation component executing within the data processing system, a relevance measure for the multigraph based on the relevance function and the occurrences of the at least one pattern. The method further comprises providing, by the data processing system, output of relevant patterns based on the occurrences of the at least one pattern.

In other illustrative embodiments, a computer program product comprising a computer useable or readable medium having a computer readable program is provided. The computer readable program, when executed on a computing device, causes the computing device to perform various ones of, and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Frequent subgraph mining is popular in many applications. Prior art solutions for subgraph mining are not scalable. Approximate solutions are often used to extract patterns in large graphs. However, prior art approximate solutions do not work on multigraphs. Nevertheless, many real networks are multi-dimensional and can be modeled as multigraphs, multimodal transportation networks, online social networks, technological networks such as peer-to-peer networks, the Internet, power networks, etc.

The illustrative embodiments provide a scalable mechanism for discovering subgraphs from multigraphs with approximation. The mechanism receives inputs of a multigraph, a function of relevance, and a minimum threshold for relevance. The multigraph represents multi-dimensional relationships between objects. The function of relevance includes a relevance measure (e.g., support) and a minimum threshold (e.g., minimum support) for the given relevance. The mechanism performs a depth-first exploration of the search space (the multigraph) to generate candidate patterns. Candidate generation occurs with a modified version of the depth-first search code to allow for multigraph expansion. The mechanism computes approximate relevance of the candidate patterns by reducing a single graph into smaller components. The mechanism outputs the relevant multigraph patterns.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of" and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
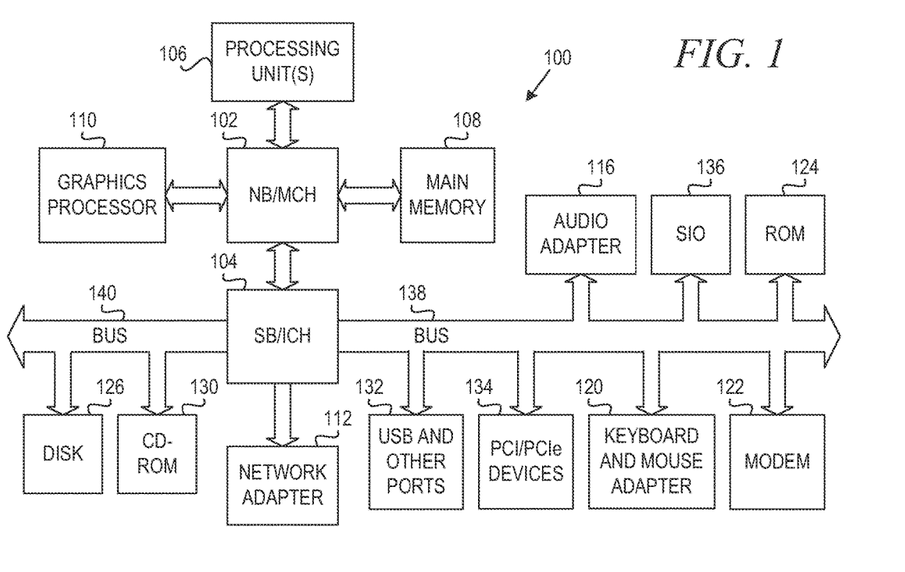
FIG. 1 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIG. 1 is provided hereafter as example environments in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

FIG. 1 is a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller huh (NB/MCH) 102 and south bridge and input/output (I/O) controller hub (SBACH) 204. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 100.

As a server, data processing system 100 may be, for example, an IBM eServer™ System P® computer system, Power™ processor based computer system, or the like, running the Advanced Interactive Executive (AIX®) operating system or the LIMA® operating system. Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multi-processor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Figure 2:
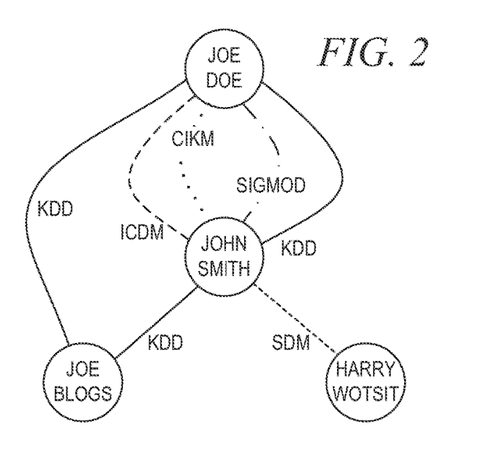
FIG. 2 illustrates an example multigraph on which aspects of the illustrative embodiments may be implemented.

FIG. 2 illustrates an example multigraph on which aspects of the illustrative embodiments may be implemented. As shown in FIG. 2, the multigraph includes four nodes connected by edges having five different dimensions. For example, the node for Joe Doe is connected to the node for John Smith by edges labeled "ICDM," "CIKM," "SIG-MOD," and "KDD." In the depicted example, the nodes represent authors. Thus, the nodes have only one dimension in this example multigraph.

Figure 3:
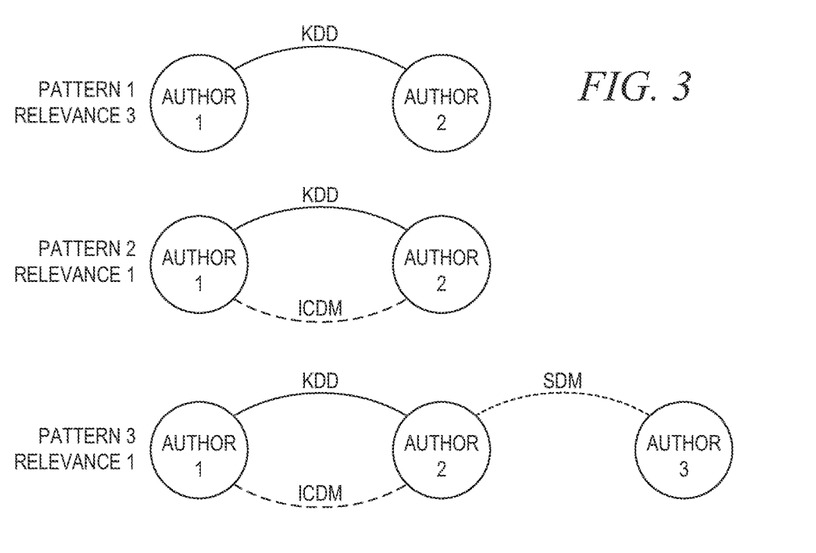
FIG. 3 illustrates example patterns to be extracted from the multigraph in accordance with an illustrative embodiment.

FIG. 3 illustrates example patterns to be extracted from the multigraph accordance with an illustrative embodiment. Pattern 1 includes two authors connected by an edge labeled "KDD." Pattern 2 includes two authors connected by edges labeled "KDD" and "ICDM." Pattern 3 includes two authors, "author 1" and "author 2," connected by two edges labeled "KDD" and "ICDM" and a third author, "author 3," connected to author 2 by an edge labeled "SDM." In the multigraph shown in FIG. 2, pattern 1 has a relevance of three, i.e., there are three instances of pattern 1 the multigraph. Pattern 2 and pattern 3 have a relevance of one, because there is one instance of each pattern in the multigraph.

In recent years, many networks containing multiple connections between pairs of nodes have been analyzed. Despite the importance of analyzing this kind of network being recognized in the prior art, previous solutions for multidimensional network analysis fail to extract relevant subgraphs from multigraphs. Previous solutions for exact relevant pattern mining are not scalable; therefore, extracting relevant subgraphs from real world multigraphs is not feasible.

Figure 4:
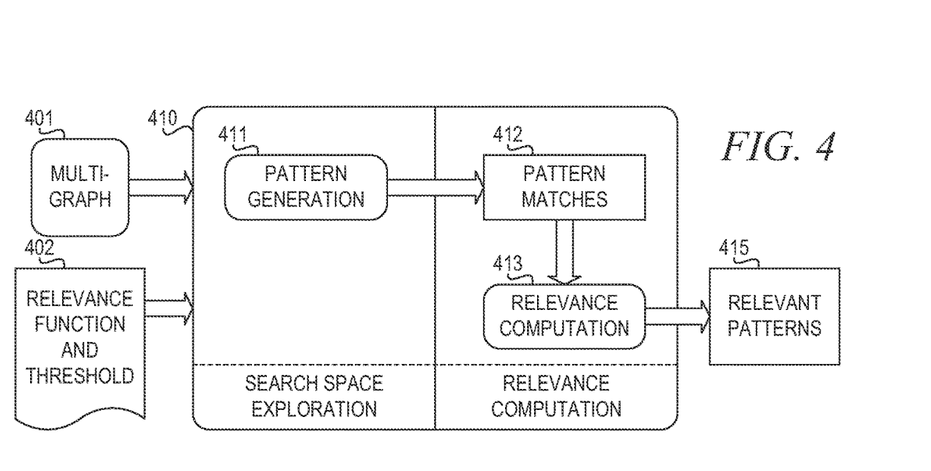
FIG. 4 is a block diagram illustrating a system for extracting relevant approximate subgraphs from multigraphs in accordance with an illustrative embodiment.

FIG. 4 is a block diagram illustrating a system for extracting relevant approximate subgraphs from multigraphs in accordance with an illustrative embodiment. Subgraph extraction system 410 receives multigraph 401 and relevance function and threshold 402. Subgraph extraction system 410 includes a search space exploration section and a relevance computation section. In the search space exploration section, pattern generation component 411 performs a depth-first exploration of the search space (i.e., multigraph 401) to generate candidate patterns 412. In accordance with the illustrative embodiment, the depth-first search code in pattern generation component 411 is expanded to allow for multigraph expansion.

In the relevance computation section, relevance computation component 413 determines a relevance measure for multigraph 401 based on pattern matches 412 with approximation, determines whether multigraph 401 is relevant based on relevance function and threshold 402, and outputs the relevant patterns 415.

Exact version matching provides the maximum number of edge disjoint matches of the pattern. However, exact version matching cannot be computed in polynomial time. In accordance with the illustrative embodiments, subgraph extraction system 410 uses approximation for extracting relevant approximate subgraphs. Approximation may determine a minimum number of distinct mappings of any edge in the pattern. Alternatively, approximation may determine a lower bound by graph partitioning. Other techniques for approximation may also be used within the scope of the illustrative embodiments.

In one example embodiment, subgraph extraction system 410 determines approximate support of the pattern matches 412 by reducing a single graph 401 into smaller components. Pattern generation component 411 identifies pattern matches 412 in each of the smaller components. Relevance computation component 413 then determines a relevance measure based on pattern matches 412.

The approximation function may be computed at data pre-processing stage, during the extraction of the subgraphs, or a combination of the above. The approximation function may be controlled by an optional parameter bounding the loss in accuracy, the execution time, memory consumption, or any measure of result quality or resource occupation. The relevance function may include frequency, functions of the nodes (e.g., sum of node labels), functions of the edges (e.g., sum of the edge labels), functions of the subgraph structure (e.g., contains triangles), or any combination of the above.

In one embodiment, in the case of approximation dividing the multigraph into a plurality of smaller components, subgraph extraction system 410 uses parallel processing to search the smaller components simultaneously. For example, subgraph extraction system 410 may send smaller components to other threads, processors, virtual processors, processing cores, processing nodes, or the like for processing in parallel.

Thus, subgraph extraction system 410 executes software including pattern generation component 411 and relevance computation component 413 on one or more processors or one or more computing devices to extract relevant approximate subgraphs from multigraphs. Pattern generation component 411 and relevance computation component 413 modify and enhance the functioning of the data processing system, processors, or multiple computing devices to support searching multigraphs, determining relevance with approximation, and extracting relevant subgraphs with reduced running time.

Furthermore, subgraph extraction system 410 is scalable for very large multigraphs. Subgraph extraction system 410, as configured with software executing on computing hardware, allows analytics to be run on large multidimensional networks to extract patterns from multigraphs as big as country-wide social media networks (e.g., approximately 100 million nodes), continental-size peer-to-peer networks (e.g., approximately 50-100 million nodes), or continental-size power networks (e.g., approximately 100 million nodes). In one embodiment, subgraph extraction system 410 performs actions on the multigraph or on the relevant subgraphs. For example, subgraph extraction system 410 may count how many users have up to 10 friends on a social networking service and 100 followers on a microblogging service. As another example, subgraph extraction system 410 may count how many peer-to-peer users connect repeatedly on weekends. As yet another example, subgraph extraction system 410 may find dense patterns of power usage close to failures in large power networks. A data processing system may then perform actions based on this information, such as suggesting friends in social networks, predict bandwidth needs for peer-to-peer networks, or prevent potential failures in power networks.

Figure 5:
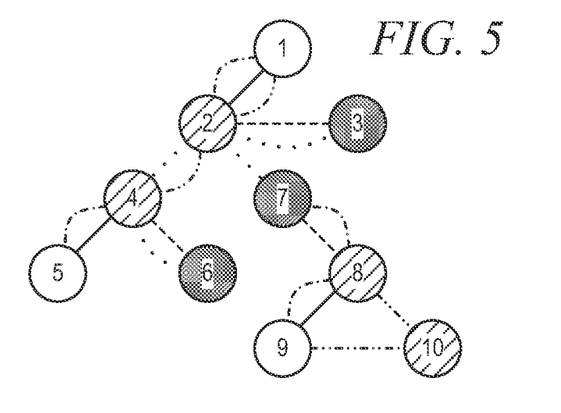
FIG. 5 illustrates an example multigraph in accordance with an illustrative embodiment.

FIG. 5 illustrates an example multigraph in accordance with an illustrative embodiment. The example multigraph includes nodes numbered 1 to 10 with three dimensions. The different shadings of the nodes represent their labels. The nodes are connected by edges of six dimensions. The different line patterns of the edges represent their labels. The patterns to be searched are also labeled multigraphs. The patterns are constructed during the exploration stage.

Figure 6A:
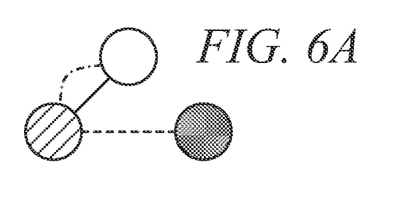
FIG. 6A illustrates an example pattern in accordance a with an illustrative embodiment.
Figure 6B:
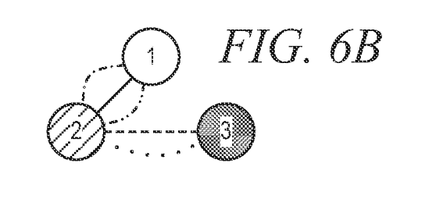
FIG. 6B illustrates an example occurrence of a pattern in the multigraph in accordance with the illustrative embodiment.

FIG. 6A illustrates an example pattern in accordance with an illustrative embodiment. FIG. 6B illustrates an example occurrence of a pattern in the multigraph in accordance with the illustrative embodiment. The pattern occurrence comprises a set of input nodes that can induce the pattern. The input graph may contain additional edges in the occurrence. Pattern occurrences are disjoint if they do not have any common input nodes.

Returning to FIG. 5, the pattern shown in FIG. 6A occurs in the multigraph three times. A first occurrence comprises nodes 1, 2, 3; a second occurrence comprises nodes 4, 5, 6; and, a third occurrence comprises nodes 9, 8, 7. Therefore, the mechanism of the illustrative embodiments would determine a relevance of three.

Computing the relevance, defined by the maximum number of disjoint pattern occurrences, is nondeterministic polynomial time (NP) complete. In accordance with the illustrative embodiment, the mechanism divides the graph into smaller components, computes the relevance of the pattern in each of the components, and adds up relevance across components. The mechanism approximates relevance such that the computed relevance is a lower bound on the exact relevance. Theoretical guarantees on the loss of accuracy are NP-complete to achieve.

Figure 7:
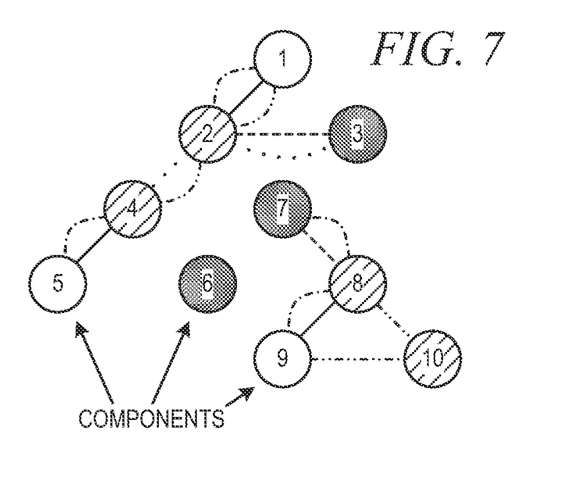
FIG. 7 illustrates an example divided multigraph in accordance with an illustrative embodiment.

FIG. 7 illustrates an example divided multigraph in accordance with an illustrative embodiment. The mechanism removes the edges between nodes 2 and 7 and between nodes 4 and 6. The mechanism then solves the same problem in each smaller graph. In this example, the mechanism selects random edges for simplicity. Each smaller component is a multigraph. For two of the components, the relevance is one (nodes 1, 2, 3 in one component and nodes 9, 8, 7 in another component). Thus, the mechanism determines the total relevance to be two.

Many different cuts exist for the graph, each providing a lower bound to the exact relevance. The mechanism makes cuts that provide a good approximation (less error) to the relevance. The following cut strategies are possible:

multi-dimensional modularity optimization (Complexity: $O(|E| |V| \log|V|)$ in the worst case and $O(|E|+|V| \log^2|V|)$ in the average case; parameter free);

weighted minimum cuts in graphs (parameter: number of cuts);

edge-between based clustering (parameter: number of cuts);

Markov clustering (MCL) in graphs (parameter free);

label-propagation based community detection (parameter fee but randomized on the seed nodes).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., tight pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the users computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
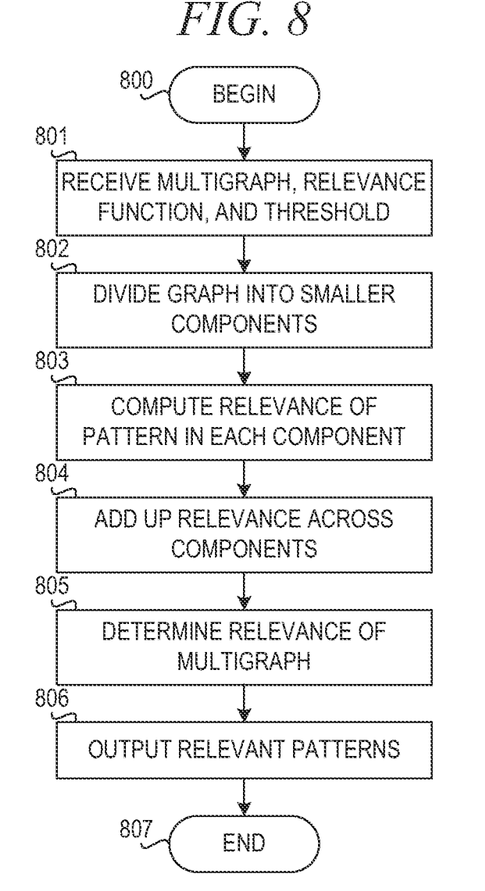
FIG. 8 is a flowchart illustrating operation of a mechanism for extracting relevant approximate subgraphs from multigraphs in accordance with an illustrative embodiment.

FIG. 8 is a flowchart illustrating operation of a mechanism for extracting relevant approximate subgraphs from multigraphs in accordance with an illustrative embodiment. Operation begins (block 800), and the mechanism receives a multigraph, a relevance function, and a threshold (block 801). The mechanism divides the graph into smaller components (block 802). The mechanism computes the relevance of the pattern in each component (block 803). The mechanism then adds up the relevance across components (block 804). The mechanism determines the relevance of the multigraph (block 805). The mechanism then outputs the relevant patterns (block 806). Thereafter, operation ends (block 807).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to specifically configure the processor to implement a subgraph extraction system for extracting subgraphs from a multigraph with approximation, the method comprising:
   receiving, by the subgraph extraction system executing on the data processing system, a multigraph and a relevance function;
   searching, by a search space exploration section of the subgraph extraction system, the multigraph for occurrences of at least one pattern based on an approximation function, wherein searching the multigraph comprises dividing, by a pattern generation component executing within the search space exploration section of the subgraph extraction system, the multigraph into a plurality of components based on application of an approximation function and searching the plurality of component for occurrences of the at least one pattern simultaneously using parallel processing;

determining, by a relevance computation component executing within a relevance computation section of the subgraph extraction system, a relevance measure for each component based on the relevance function and the occurrences of the at least one pattern;

determining, by the relevance computation component, an overall relevance measure for the multigraph based on the relevance measures of the plurality of components; and providing, by the subgraph extraction system, output of relevant patterns based on the occurrences of the at least one pattern.

2. The method of claim 1, wherein dividing the multigraph into the plurality of components is based on a cut strategy, wherein the cut strategy comprises multidimensional modularity optimization, weighted minimum cuts in graphs, edge-betweenness based clustering, Markov clustering, or label propagation based community detection.

3. The method of claim 1, wherein the approximation function is computed at data pre-processing stage or during searching the multigraph.

4. The method of claim 1, wherein the approximation function is controlled by a parameter bounding a loss in accuracy or resource consumption.

5. The method of claim 1, wherein the relevance function is defined as a function of frequency, node labels, edge labels, or subgraph structure.

6. The method of claim 1, further comprising:

performing, by the data processing system, an action on entities or relationships represented by the relevant patterns.

7. The method of claim 6, wherein performing the action on the entities or relationships represented by the relevant patterns comprises suggesting friends in social networks, predicting bandwidth needs for peer-to-peer networks, or preventing potential failures in power networks.

8. The method of claim 1, wherein the at least one pattern comprises at least one labeled multigraph.

9. The method of claim 1, wherein searching the plurality of component for occurrences of the at least one pattern simultaneously using parallel processing comprises sending the plurality of components to a plurality of threads, processors, virtual processors, processing cores, or processing nodes.

* * * * *